United States Patent [19]
Wohlfahrt-Laymann

[11] Patent Number: 5,308,562
[45] Date of Patent: May 3, 1994

[54] RECYCLING PROCESS AND APPARATUS FOR THE PRODUCTION OF POLYMER FROM THERMOPLASTIC POLYCONDENSATE

[75] Inventor: Hendrik Wohlfahrt-Laymann, Stuttgart, Fed. Rep. of Germany

[73] Assignee: Werner & Pfleiderer GmbH, Stuttgart, Fed. Rep. of Germany

[21] Appl. No.: 15,621

[22] Filed: Feb. 9, 1993

[30] Foreign Application Priority Data

Mar. 13, 1992 [DE] Fed. Rep. of Germany ....... 4208099

[51] Int. Cl.⁵ .............................................. B29C 47/40
[52] U.S. Cl. .................................... 264/101; 159/2.2; 264/102; 264/211.23; 264/349; 264/DIG. 69; 425/203; 425/204; 425/205; 425/382.3
[58] Field of Search ...... 264/102, 101, 211.21–211.24, 264/349, DIG. 69; 425/203, 204, 205, 382.3, 209; 159/2.2

[56] References Cited

U.S. PATENT DOCUMENTS

| | | | |
|---|---|---|---|
| 3,357,478 | 12/1967 | Donovan | 159/2.2 |
| 3,486,864 | 12/1969 | Van Der Schee et al. | 425/205 |
| 3,508,683 | 4/1970 | Van Der Schee | 264/211.23 |
| 3,553,171 | 1/1971 | Ocker | 264/211.24 |
| 3,619,145 | 11/1971 | Crawford et al. | 264/102 |
| 3,787,160 | 1/1974 | Leister . | |
| 3,797,550 | 3/1974 | Latinen | 425/203 |
| 3,963,679 | 6/1976 | Ullrich et al. | 264/211 |
| 4,107,787 | 8/1978 | Ocker | 264/102 |
| 4,409,167 | 10/1983 | Kolouch et al. | 425/203 |
| 5,102,594 | 4/1992 | Burlet et al. | 264/101 |
| 5,176,861 | 1/1993 | Ishikawa | 264/101 |

FOREIGN PATENT DOCUMENTS

| | | | |
|---|---|---|---|
| 0119029 | 9/1984 | European Pat. Off. | 425/203 |
| 2449787 | 4/1976 | Fed. Rep. of Germany | 264/102 |

*Primary Examiner*—Jeffery Thurlow
*Attorney, Agent, or Firm*—Ladas & Parry

[57] ABSTRACT

A process and apparatus for the production of a polymer of thermoplastic polycondensate in which the polymer is first treated in a screw extruder and then in a mixing tank. In the extruder the polycondensate is heated in a first zone to a temperature below its melting point and thereafter it is heated to a temperature above its melting point at a vacuum. Water and other volatile components are removed from the first and second zones of the extruder. In the mixing tank the polymer is maintained under vacuum conditions and is conveyed and mixed by spiral mixing blades to remove residual water and volatile components. The polymer is discharged at the bottom of the mixing tank by a melt pump after a residence time of between 5 and 60 minutes in the mixing tank.

23 Claims, 1 Drawing Sheet

RECYCLING PROCESS AND APPARATUS FOR THE PRODUCTION OF POLYMER FROM THERMOPLASTIC POLYCONDENSATE

FIELD OF THE INVENTION

The invention relates to a process and apparatus for recycling thermoplastic material and particularly for reprocessing thermoplastic material to produce a high molecular weight polymer from a thermoplastic condensate.

BACKGROUND AND PRIOR ART

The reprocessing and subsequent utilization of thermoplastic material has been of increasing importance and reprocessing methods and apparatus for producing polymers of thermoplastic condensate are known in the art.

It has been previously found that there is a problem with regard to sufficient removal of low molecular substances, particularly water, from the polymer in order to prevent material decomposition and thus to produce a satisfactory polymer product with sufficient final viscosity.

Attempts have been made to remove the moisture of recondensation deposited on the surface as well as the interior of the thermoplastic materials by a preliminary drying operation. However, this requires considerable time.

DE 29 42 248 discloses a reprocessing method in which finely shredded fibers of polyethylene terephthalate are initially compacted in a screw press and the compressed fibers are introduced into a dual screw extruder to remove additional water and volatile impurities from a melt of the fibers in the extruder. After filtration of the product it is recondensed in an autoclave under reduced pressure to increase its viscosity without addition of new polymer.

The pressure buildup necessary in this relatively expensive process for repeated product delivery leads to an undesirable molecular decomposition. In addition the energy losses over a relatively long processing time are considerable.

DE 21 28 468 discloses a batch mixer having spiral blades which rotate opposite one another in a hopper-shaped tank for the final processing in a condensation polymerization. The batchwise treatment does not produce a satisfactory grade of the polymer since a sufficient breakdown of the polymer mass is not produced in the small volume of the mixer.

SUMMARY OF THE INVENTION

An object of the invention is to provide a method and apparatus for the recycling of thermoplastic material to produce a high grade end product without separate pre-drying while utilizing a screw extruder of relatively short length.

The above and further objects are achieved according to the invention by a method comprising supplying polycondensate into a screw extruder, and advancing the polycondensate through a first zone of the extruder, in which the polycondensate is heated to a temperature below the melting point of the polycondensate, and water and gases are removed from the polycondensate. The polycondensate then advances in the screw extruder through a second zone thereof downstream of said first zone, in which the polycondensate is heated to a temperature above its melting point to form a polymer melt. The polymer passes through a sealed region in said second zone and further water components and volatile components are removed from said melt in said sealed region by applying a vacuum thereto.

The melt is transferred from said screw extruder directly into a mixing tank which is maintained under a vacuum. The melt is mixed in said mixing tank for a determined residence period to remove residual water and volatile components from the melt, and is discharged from said mixing tank.

The above method can be conducted in a compact apparatus without further auxiliary means by virtue of its combined multi-stage and multi-zone arrangement. Due to the fact that the polymer is delivered from the extruder to the mixing tank directly and under vacuum, intermediate molecular decomposition does not occur.

Essentially according to the invention there is direct combining of the degassing process conducted in the screw extruder in which the screws tightly intermesh and rotate in the same direction with the degassing process conducted in the mixing tank whereby the residence time of the polymer and thereby its product quality can be influenced in the mixing tank by means of the mixing blades therein. Namely, inadequate removal of water from the polymer in the screw extruder can be prevented to minimize viscosity loss of the polymer due to the decomposition of the molecular chain.

In the combination of the screw extruder with the mixing tank, the length of the screw extruder can be shortened to an economically effective extend without reduction of product quality. Also the risk of overflow of the polymer in the region of the screw extruder where the vacuum is applied is virtually eliminated for high throughput of polymer.

In further accordance with the method of the invention, the polymer is conveyed upwardly when introduced into the mixing tank against gravity into an upper portion of the tank and the polymer is ultimately discharged from the mixing tank by a melt pump at the bottom of the tank so that when the polymer travels from the upper portion of the tank to the melt pump it is assisted by gravity in a lower portion of the mixing tank. The upper and lower portions of the mixing tank taper conically in opposite directions to provide a continuously varying surface of the thermoplastic melt which allows minimized residence time and high output. This is further enhanced by maintaining the vacuum in the sealed region of the extruder at a pressure less than 5 mbar and by maintaining the vacuum in the mixing tank at a pressure less than 5 mbar.

According to a further aspect of the invention there is provided an apparatus comprising a dual screw extruder including a housing having overlapping longitudinal bores therein and two rotatable screws in said bores tightly meshing with one another, said extruder having three successive zones arranged longitudinally thereof. The first of said zones is a conveyor zone having an inlet for plastic polycondensate, the polycondensate being heated to a temperature in said first zone which is lower than the melting point of the polycondensate. The screws which convey the polycondensate through the first zone and water and other low molecular components are removed from the polymer through a degassing opening in said first zone. In the second of said zones the polymer is heated to a temperature above its melting point to produce a polymer melt. The conveyor screws include a first set of kneading disks in a region of said second zone adjoining said first zone to knead the polymer melt. The kneading disks produce reduced advance of the melt in the extruder. Two further sets of kneading disks are spaced longitudinally in said extruder in said second zone downstream of the first set of kneading disks, said further sets of kneading disks being arranged in said housing so as not to produce advance of said melt in said extruder. The housing is provided with a degassing outlet between said further sets of kneading disks at which a vacuum is applied. A mixing tank is in direct communication with said extruder at the third of said zones thereof for receiving the polymer melt therefrom, said mixing tank comprising a vertical housing, rotatable, spiral mixing blades in said housing which engage one another and walls of said housing to clean the same of polymer melt, drive means for rotating said mixing blades in the housing of the mixing tank, and a melt pump connected to said housing of the mixing tank for pumping the melt from said housing of the mixing tank. The mixing tank is maintained under a vacuum and this prevails in the third zone of the extruder which directly communicates with the mixing tank.

In the above apparatus, extensive water evaporation is produced for a relatively short length of the apparatus. It is significant that the water evaporation in the final stage in the mixing tank is produced to a maximum degree by creating a large continuously regenerating surface of the polymer in the mixing tank, whereby the polymer moves continuously, as in the extruder and the melt pump. Moreover, deposition of polymer in the mixing tank is prevented by the cleaning or stripping action of the mixing blades in the mixing tank. Furthermore, the residence time of the material can be adjusted by the conveyance action of the mixing blades which represents an essential advantage for the treatment of the polymer.

DETAILED DESCRIPTION OF A PREFERRED EMBODIMENT

Figures 1, 2:
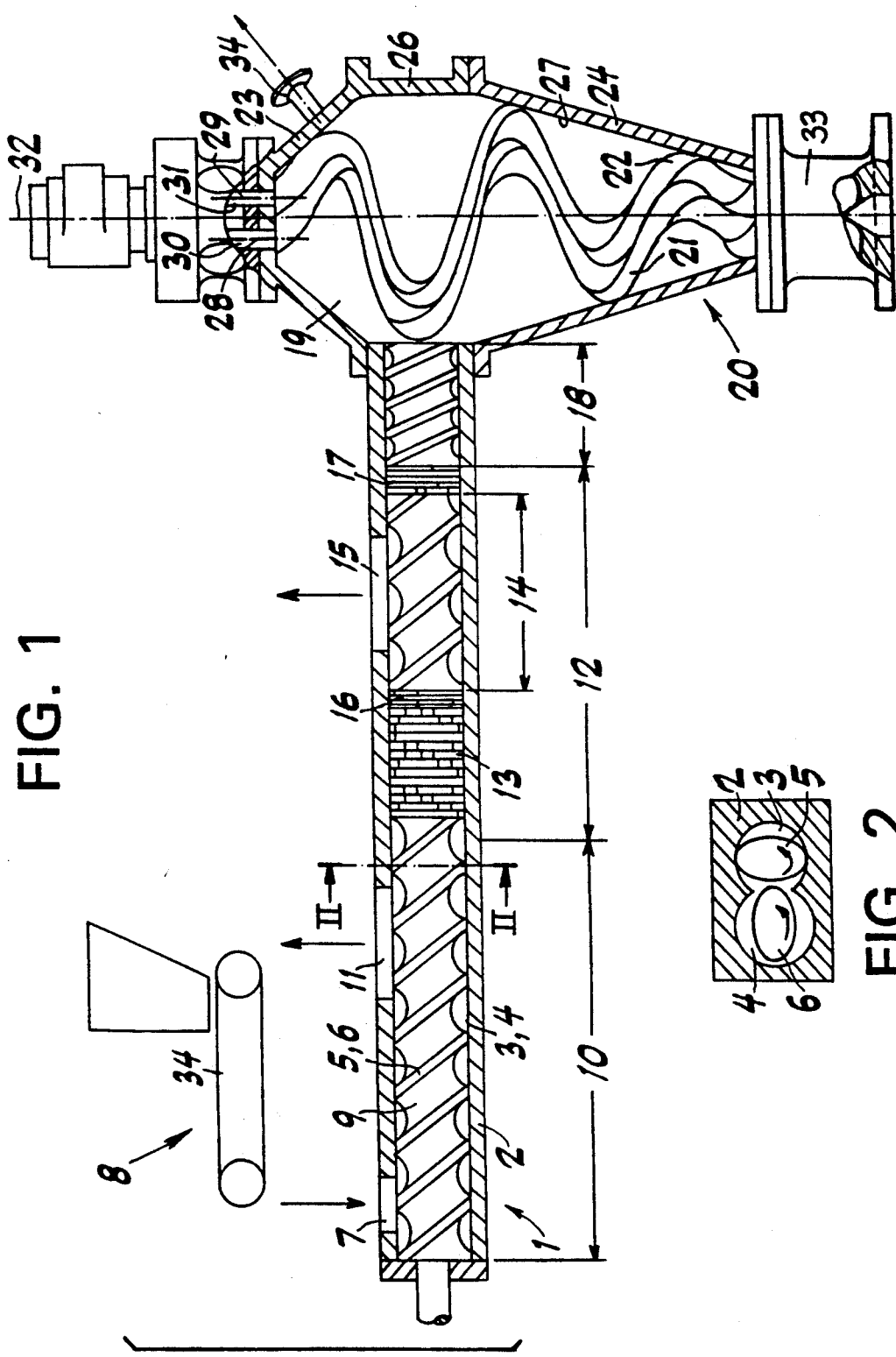
FIG. 1 is a side view, partially in vertical cross section of apparatus according to the invention.
FIG. 2 is a cross sectional view taken on line II—II in FIG. 1.

In FIG. 1 there is seen a screw kneader or extruder 1 which comprises a heatable housing 2 provided with overlapping longitudinal bores 3, 4 containing respective dual screws 5, 6 having threads which tightly mesh with one another. The screws 5, 6 are driven in the same direction of rotation by a drive means (not shown). The direction of rotation of the screws 5, 6 is shown by the arrows in FIG. 2.

The extruder 1 is provided with three successive zones 10, 12 and 18 arranged longitudinally thereof.

In the first zone 10, the housing is provided with a supply opening 7 for introduction of thermoplastic polycondensate which is supplied in measured amounts from a distributor 8. The distributor 8 comprises a conventional conveyor 34 which introduces the thermoplastic polymer at a rate so that the chambers of the screws 5, 6 between the threads thereof are only partially filled, generally in an amount representing 50-60% of the maximum capacity of the screws.

The zone 10 of the extruder 1 represents a supply and conveyor zone which extends downstream from supply opening 7 and wherefrom moisture is removed from the polycondensate at an evaporation opening 11 in housing 2. In zone 10 the polymer is heated to a temperature below its melting point.

In zone 12 downstream of zone 10, the polymer is heated to a temperature above its melting point. At the upstream end of zone 12, a plurality of kneading disks 13 are formed on the screws and the disks 13 serve as conveyors and kneaders. Downstream of the kneading disks 13 and within zone 12 is a conveyor segment 14 of the screws. At the upstream and downstream ends of conveyor segment 14 are respective sealing regions 16 and 17. Each of the sealing regions contains respective kneading disks on the screws which provide no significant conveyance of the polymer melt in the housing and serve as sealing means. The housing 2 is provided in the conveyor region 14 with a discharge opening 15 for water and other low molecular components which are removed under vacuum. The sealing regions 16 and 17 preserve the vacuum condition in the region 14.

In zone 18 the polymer melt is conveyed by the screws 5, 6 from the end of the housing 2 which directly opens into the interior 19 of a mixing tank 20. In the mixing tank are rotatably supported spiral mixing blades 21, 22. The mixing tank 20 has a housing with a flange directly mounted on the housing 2 of the extruder so that the longitudinal bores 3, 4 in the housing 2 will be in direct communication with the interior 19 of mixing tank 20. The remainder of the interior 19 in the mixing tank 20 is sealed in air tight manner and the interior 19 is maintained at vacuum pressure. The vacuum pressure will also act on the third zone 18 of the extruder.

The mixing tank 20 is heated in conventional manner to maintain the polymer in its molten condition in the mixing tank. The mixing tank comprises upper and lower conical portions 23 and 24 which narrow in opposite directions and the conical portions are joined in sealed manner at their ends of maximum diameter to an intermediate cylindrical body 26. The end of the extruder housing at zone 18 is connected to the cylindrical body 26 of the mixing tank 20.

The spiral mixing blades 21, 22 are driven in rotation in the same direction in the mixing tank 20 by a drive motor 25 and the spiral blades mix the polymer in the mixing tank while stripping material from one another and from the walls 27 of the tank. The drive motor 25 is mounted at the top of the upper conical portion 23. The spiral mixing blades 21, 22 have respective upper shaft ends 30, 31 rotatably mounted in the mixing tank for rotation about respective axes 28, 29. The shaft ends 30, 31 are drivingly connected to drive motor 25. The axes of rotation 28, 29 of the spiral mixing blades are offset symmetrically by equal distances from the longitudinal axis 32 of the tank 20. The axes 28, 29 extend parallel to the longitudinal axis 32.

At the lower end of mixing tank 20 a melt pump 33 is mounted on conical portion 24 for delivery of the final polymer product from the mixing tank. The spiral mixing blades 21, 22 have a direction of rotation and a direction of spiral winding to mix the thermoplastic material and convey the material which is introduced into the mixing tank to the upper portion 23 of the mixing tank, against gravity, whereby a homogeneous intermixing and continuous surface regeneration of the conveyed material is produced over the length of the mixing tank. The configuration of the mixing tank 20 with its two conical portions 23, 24 of reverse taper makes it possible to provide a large degassing surface in the region of cylindrical body 26 where the mixing tank 20 has its maximum interior diameter whereby there is continuous renewal of the degassing surface by the conveyor action of mixing blades 21, 22 so that residual components of low molecular substances such as water vapor which are still present are driven off under vacuum. For this purpose a degassing opening 34 is provided in the upper conical portion 23 and a vacuum source is connected to opening 34. The components of the thermoplastic condensate of low viscosity are conveyed to the top of the mixing tank 20 by the conveyor action of the mixing blades 21, 22 while the viscous heavy components are collected in the region above the melt pump 33 and are continuously discharged by the pump from the mixing tank.

Depending on the thermoplastic material to be processed it may be advantageous to form the mixing blades 21, 22 in the lower third of mixing tank 20 with a reverse spiral winding which acts opposite the upwards conveyor action of the remainder of the spiral mixing blades. Namely, in the lower third of the mixing tank the spiral blades act to convey the polymer material downwardly with assistance by gravity. Moreover, this is achieved without reversal of the direction of rotation of the blades.

The continuous discharge of the polymer by melt pump 33 at the outlet of mixing tank 20 enables the product to be transported from the mixing tank for subsequent treatment and packaging.

The process and apparatus of the invention are suitable for the recycling of plastic waste as the plastic material can be treated to produce high viscosity, high molecular weight products. In this way new material can be mixed with plastic waste to produce an end product.

In order to keep the apparatus compact, the kneading disks 13 in the extruder housing have a length in the longitudinal direction of the housing which is between 2 and 5 times its diameter. The kneading disks 16 and 17 have a length in the longitudinal direction of the housing of the extruder which is between 0.5 and 1 times its diameter. In order to control the residence time of the polymer in the mixing tank 20, the drive motor 25 for rotating the spiral mixing blades 21, 22 has a variable drive speed. In the mixing tank 20 the upper conical portion 23 has a length along the axis of the mixing tank which is substantially less than the length of the lower portion 24.

The invention will be described further hereafter with respect to an example for the production of recycled polymer material.

EXAMPLE

Staple fibers of polyethylene terephthalate, as crude materials with a water content of 4000 ppm, are continuously fed into the supply opening 7 of extruder 1. The screws 5, 6 of the extruder have a diameter D of 40 mm. The threads of the screws 5, 6 are filled to approximately 50–60% of capacity. The screws 5, 6 are driven at a speed of 150 rpm. The length of housing 2 of the extruder is 24 D. The polycondensate is maintained at a temperature of 280° C. in zone 10 and it is then further heated to a temperature above its melting point in zone 12. Water and other low molecular components are removed at discharge outlets 11 and 15. A vacuum of 1 mbar is maintained at outlet 15. The supply of polymer is continuous and the polymer is continuously delivered without pressure buildup to the mixing tank 20. The polymer is mixed in the mixing tank 20 and remains approximately 40 minutes in the mixing tank. The initial viscosity of the polymer entering the mixing tank is 0.6 $dm^3g$ and the viscosity is raised in the mixing tank to a final intrinsic viscosity of 0.95 $dm^3g$. In the case of the given residence time the polycondensate in the mixing tank was mixed in a continuous homogeneous manner under a vacuum of 1 mbar with a conveyance action of the spiral mixing blades directed upwardly. The gear pump 33 discharged the final polymer at a total throughput rate of approximately 30 kg/h.

Although the invention has been described in relation to a specific embodiment thereof, it will become apparent to those skilled in the art that numerous modifications and variations can be made within the scope and spirit of the invention as defined in the attached claims.

What is claimed is:

1. A reprocessing process of producing polymer from plastic polycondensate comprising:
   supplying polycondensate into a screw extruder having dual screws rotating in the same direction,
   advancing the polycondensate through a first zone of the extruder,
   heating the polycondensate in said first zone to a temperature below the melting point of the polycondensate,
   removing water and gases from the polycondensate in said first zone,
   conveying the polycondensate in the screw extruder into a second zone thereof downstream of said first zone,
   heating the polycondensate in said second zone to a temperature above the melting point of said polycondensate to form a melt,
   conveying the polycondensate through a sealed region in said second zone as the polycondensate is being advanced in the screw extruder,
   removing further water components and volatile components from said melt in said sealed region while applying a vacuum thereto,
   conveying said polycondensate through a third zone downstream of the sealed region of the second zone,
   discharging the melt from said third zone of the screw extruder directly into a vertical mixing tank,
   producing a vacuum in the mixing tank which is also established in said third zone,
   conveying the melt in said mixing tank while mixing the melt during a residence period in said mixing tank to remove residual water and volatile components from the melt,
   discharging the melt from said mixing tank.

2. A process as claimed in claim 1, wherein said melt is conveyed in said mixing tank upwardly against gravity in an upper portion of the tank.

3. A process as claimed in claim 1, wherein the vacuum in said sealed region in said second zone is less than 5 mbar.

4. A process as claimed in claim 3, wherein the vacuum in the mixing tank is less than 5 mbar.

5. A process as claimed in claim 2, wherein the melt is discharged at a lower end of the mixing tank.

6. A process as claimed in claim 5, comprising removing gases from said mixing tank at an upper portion thereof.

7. Apparatus for producing polymer from plastic polycondensate comprising a dual screw extruder including a housing having overlapping longitudinal bores therein and two rotatable screws in said bores having threads tightly meshing with one another, said extruder having three successive zones arranged longitudinally thereof, the first of said zones being a conveyor zone having an inlet for plastic polycondensate, which is heated to a temperature in said first zone which is lower than the melting point of the polycondensate, said screws conveying the polycondensate through the three zones of the extruder, said housing having a degassing opening in said first zone, the polycondensate being heated in the second of said zones to a temperature above its melting point to produce a polymer melt, said conveyor screws including a first set of kneading disks in a region of said second zone to knead the polymer melt during its advance in the extruder, two further sets of kneading disks spaced longitudinally in said extruder in said second zone downstream of the first set of kneading disks, said further sets of kneading disks being arranged in said housing so as not to produce advance of said melt in said extruder, said housing having a degassing outlet between said further sets of kneading disks at which a vacuum is applied, the third of said zones being downstream of the second zone and having an outlet for discharge of the polymer melt from the extruder, and a mixing tank in direct communication with said extruder at the outlet of said third zone for receiving the polymer melt therefrom, said mixing tank comprising a vertical housing, rotatable, spiral mixing blades in said housing which engage one another and walls of said housing to clean the same of polymer melt, drive means for rotating said mixing blades in the housing of the mixing tank, and a melt pump connected to said housing of the mixing tank for pumping the melt from said housing of the mixing tank, said spiral mixing blades having a direction of spiral winding and being driven by said drive means in a direction related to the direction of spiral winding to urge polymer in said mixing tank upwardly against the action of gravity, said housing of said mixing tank having a longitudinal axis, said spiral mixing blades being rotatable around respective axes of rotation offset from said longitudinal axis.

8. Apparatus as claimed in claim 7, wherein said housing of the mixing tank has a lower end at which said melt pump is disposed.

9. A process as claimed in claim 1, comprising effecting the conveying and mixing of the melt in said mixing tank by rotating two spiral mixing blades in the mixing tank in the same direction.

10. Apparatus as claimed in claim 9, wherein said spiral mixing blades are spirally wound in a lower portion of the housing of the mixing tank to urge polymer downwardly in said lower portion.

11. Apparatus as claimed in claim 7, wherein said further sets of kneading disks each has a length in the longitudinal direction of the housing of the extruder which is between 0.5 and 1 times its diameter.

12. Apparatus as claimed in claim 7, wherein said first set of kneading disks has a length in the longitudinal direction of the housing of the extruder which is between 2 and 5 times its diameter.

13. Apparatus as claimed in claim 7, wherein said drive means for rotating said mixing blades has a variable drive speed.

14. Apparatus as claimed in claim 7, wherein said further sets of kneading disks provide sealing in said housing of the extruder on opposite sides of the degassing outlet in said second zone to maintain the vacuum applied thereat.

15. A process as claimed in claim 9, comprising effecting the rotating of said spiral mixing blades around respective axes of rotation offset from a vertical, longitudinal axis of the mixing tank.

16. Apparatus as claimed in claim 7, wherein said axes of rotation of said mixing blades are symmetrically offset from said longitudinal axis.

17. Apparatus as claimed in claim 7, wherein said housing of said mixing tank includes an upper conical portion which narrows upwardly and a lower conical portion which narrows downwardly.

18. Apparatus as claimed in claim 17, wherein said housing of said mixing tank includes a cylindrical portion interconnecting said conical portions, said housing of said extruder being connected to said cylindrical portion and directly opening into the interior of said housing of said mixing tank thereat.

19. Apparatus as claimed in claim 18, wherein said upper portion of said mixing tank has a length along the axis of the mixing tank which is less than the length of the lower portion of said mixing tank along said axis.

20. Apparatus as claimed in claim 19, wherein said housing of the mixing tank has an inlet in said cylindrical portion at which said housing of the extruder is joined horizontally.

21. Apparatus for producing polymer from plastic polycondensate comprising a dual screw extruder including a housing having overlapping longitudinal bores therein and two rotatable screws in said bores having threads tightly meshing with one another, said extruder having three successive zones arranged longitudinally thereof, the first of said zones being a conveyor zone having an inlet for plastic polycondensate, which is heated to a temperature in said first zone which is lower than the melting point of the polycondensate, said screws conveying the polycondensate through the three zones of the extruder, said housing having a degassing opening in said first zone, the polycondensate being heated in the second of said zones to a temperature above its melting point to produce a polymer melt, said conveyor screws including a first set of kneading disks in a region of said second zone to knead the polymer melt during its advance in the extruder, two further sets of kneading disks spaced longitudinally in said extruder in said second zone downstream of the first set of kneading disks, said further sets of kneading disks being arranged in said housing so as not to produce advance of said melt in said extruder, said housing having a degassing outlet between said further sets of kneading disks at which a vacuum is applied, the third of said zones being downstream of the second zone and having an outlet for discharge of the polymer melt from the extruder, and a mixing tank in direct communication with said extruder at the outlet of said third zone for receiving the polymer melt therefrom, said mixing tank comprising a vertical housing, rotatable, spiral mixing blades in said housing which engage one another and walls of said housing to clean the same of polymer melt, drive means for rotating said mixing blades in the housing of the mixing tank, and a melt pump connected to said housing of the mixing tank for pumping the melt from said housing of the mixing tank, said housing of said mixing tank including an upper conical portion which narrows upwardly, a lower conical portion which narrows downwardly, and a cylindrical portion interconnecting said conical portions, said third zone of said housing of said extruder being connected to said cylindrical portion with said outlet of said third zone directly opening into the interior of said housing of said mixing tank at said cylindrical portion.

22. Apparatus as claimed in claim 21, wherein said upper portion of said mixing tank has a length along the axis of the mixing tank which is less than the length of the lower portion of said mixing tank along said axis.

23. Apparatus as claimed in claim 21, wherein said housing of the mixing tank has an inlet in said cylindrical portion at which said housing of the extruder is joined horizontally.

* * * * *